United States Patent [19]

Hillegonds et al.

[11] 4,406,514

[45] Sep. 27, 1983

[54] SINGLE FIBER CONNECTOR FOR PLUGGABLE CARD OR MODULE OPTICAL INTERCONNECTIONS

[75] Inventors: Clarence G. Hillegonds, Palm Bay; William C. Stankos, Melbourne, both of Fla.; Peter G. File, Roanoke, Va.; Luther P. Mills, Melbourne, Fla.

[73] Assignee: Harris Corporation, Melbourne, Fla.

[21] Appl. No.: 134,225

[22] Filed: Mar. 26, 1980

[51] Int. Cl.³ .............................................. G02B 7/26
[52] U.S. Cl. .................................................. 350/96.21
[58] Field of Search ................ 350/96.20, 96.21, 96.22

[56] References Cited

U.S. PATENT DOCUMENTS

| | | | |
|---|---|---|---|
| 4,162,119 | 7/1979 | Goodman | 350/96.21 |
| 4,178,068 | 12/1979 | Hoover | 350/96.21 |
| 4,205,897 | 6/1980 | Stankos | 350/96.21 |
| 4,215,913 | 8/1980 | Turley et al. | 350/96.21 |
| 4,217,030 | 8/1980 | Howarth | 350/96.21 |
| 4,268,114 | 5/1981 | d'Auria et al. | 350/96.20 |
| 4,294,512 | 10/1981 | Logan | 350/96.20 |

*Primary Examiner*—John D. Lee
*Attorney, Agent, or Firm*—Antonelli, Terry & Wands

[57] ABSTRACT

A single fiber connector for a pluggable card or module optical interconnection is formed of a connector socket that may be mounted to a printed circuit card or optical module and a connector pin that is attached to a housing or a suitable bulkhead by which the printed circuit card or optical module is to be supported. Each of the connector socket and the connector pin has an internally threaded axial bore for receiving and retaining a single optical fiber cable coupler from the end of which an optical fiber strand extends. Each pin and socket includes a further precision bore through which the fibers pass to abut end-to-end in the precision bore of the socket. The socket further has a tapered end male section that is inserted into a corresponding tapered end female section of the pin, with the fiber held by the pin being automatically guided into the precision bore of the male section of the socket as the printed circuit card or module is inserted into the connector on the bulkhead. To effect this automatic guidance of the fibers together, a bracket is mounted on the printed circuit card for holding the connector socket. The bracket is dimensionally positioned relative to the end of the card so that when the card is mounted on the bulkhead through associated hardware, such as electrical pin connector support units, the optical fiber connector and socket will be properly dimensionally located for alignment and fiber coupling.

21 Claims, 5 Drawing Figures

SINGLE FIBER CONNECTOR FOR PLUGGABLE CARD OR MODULE OPTICAL INTERCONNECTIONS

FIELD OF THE INVENTION

The present invention relates to a connector arrangement for optical fibers and is particularly directed to an optical fiber connector assembly suited for intimately joining with low loss the ends of single optical fibers used in conjunction with opto-electronic, electro-optic circuit components provided on printed circuit boards, that are to be joined with optical fibers leading from the hardware mounting configuration by way of which the boards are retained in a cabinet, rack or the like.

BACKGROUND OF THE INVENTION

The development of modular electronic and opto-electronic systems has been accompanied by a need for hardware components and device interconnection or coupling configurations that afford ease of assembly and fidelity of signal coupling across various interface points. For example, numerous types of electrode connectors are available for coupling printed circuit boards or cards to cabinet or hardware mounting receptacles. At the lower end of the signal spectrum the signal highways on a board or card have been advantageously formed by intricate patterns of selectively plated or etched conductive film that is joined to a considerably physically larger connector electrode arrangement that may serve to both electrically connect the card with an interface port device in the rack or cabinet in which it is mounted and provide actual physical support for the card in its housing.

Where the circuit cards or modules include electrooptic or opto-electronic components requiring the need for optical communication highways such as optical fibers, separate connectors exclusively for the optical connections apart from the normal electrode connectors must be provided. Because of the characteristics of optical fibers and associated optical signalling components, extremely precise coupling between components to be joined together is required and often leads to mechanical configurations that are complicated, bulky, or hinder the physical handling (e.g. insertion and removal) of the printed circuit card or module from the support housing in which it is retained.

Descriptions of examples of prior art configurations for joining optical fibers together may be found in the U.S. Pat. Nos. to Slaughter 4,076,376, Martin 3,948,582, Dalgleish 3,923,371, Makuch et al 4,140,367, and Dalgleish et al 4,008,948. For the most part such arrangements require the actual physical handling of the connector assembly when joining the fibers together and none are suited to facilitate the blind coupling of a card or printed circuit board mounted device to a housing connector. For example, the connectors described in the patents to Martin, Dalgliesh and Slaughter are basically cable-to-cable couplers that must be manipulated by hand with the male and female sections being carefully guided together followed by the positioning or displacement and tightening or gripping of a surrounding outer sleeve section. The couplers described in the patents to Makuch et al and Dagleish et al may have one section bulkhead mounted, with the other section attached to the end of a cable the carried fiber or fibers of which are to be coupled to the fiber or fibers held by the connector section that is mounted on the bulkhead. Still, careful hand-manipulation of the joining of the cable end to the bulkhead receptacle is required and neither type is suited for a blind coupling of an optical fiber mounted on a card or printed circuit board of the card support.

In FIG. 1, there is a general illustration of the mounting of a printed circuit board or card 8 containing a plurality of electronic components 7 provided on the card and which are usually joined with one another by way of a selectively etched or plated conductor highway pattern on the surface of the card to a bulkhead type of connector. Printed circuit card 8 may include an electro-optic or opto-electronic component 6, such as an LED, APD, etc. electrically coupled to the conductor highway pattern and optically associated with a fiber coupling portion 1 that contains an optical fiber strand. The hardware interfacing of the conductor highways on the card to the outside world is usually achieved by a connector 5 physically attached to one end of the card. Connector 5 may include a plurality of conductive pins that are electrically joined to the conductor highways on the card and which have a physical configuration such that they couple to an associated plural pin connector mounted to a bulkhead or drawer wall 100 in the housing containing the card 8. The pins of the connector mounted in the bulkhead or wall are attached to the wires of electrical cable that extend exteriorly of the housing. Thus, the printed circuit card connector serves dual functions: it provides a conductor hardware interface between the components that are soldered to the plated conductor highway on the card 8 to exterior electrical wires; and it serves as a mechanical support and attachment for mounting the printed circuit card 8 to bulkhead 100. Moreover, both of these functions are achieved simultaneously during assembly simply by inserting the card and its attached connector 5 into a corresponding connector mounted on bulkhead 100. Unfortunately, the coupling of the optical fiber leading from component 6 to a bulk-head connector 2 has not been accomplished so easily, since prior art fiber connectors are basically cable-to-cable connectors requiring independent and careful hand manipulation. Even in those arrangements that are adapted to be coupled to a cabinet type or bulkhead mounted connector, such as described in the above-referenced patents to Dalgleish et al and Makuch et al, the attachment of the cable plug to a bulkhead mounted socket requires hand manipulation of the coupling components.

SUMMARY OF THE INVENTION

It is accordingly an object of the present invention to provide an optical fiber connector for simply and faithfully joining an optical fiber associated with electro-optical or opto-electronic components contained on a pluggable card to an optical fiber receptacle mounted on the support by which the pluggable card is to be held.

It is a further object of the invention to provide an optical fiber connector for a pluggable card that is effectively blind so that hand manipulation of the fiber connector separate from the handling of the card is unnecessary.

It is still an additional object of the present invention to provide a blind single fiber connector for a pluggable card or for module optical interconnections that ensures intimate physical contact of the ends of the optical fibers being joined together at all times.

It is also an object of the present invention to provide a blind single fiber connector for a pluggable card or for optical module interconnections that is very low loss so as to provide a high degree of optical signal continuity across the fiber-to-fiber interface.

It is another object of the present invention to provide a blind single fiber connector for a pluggable card or for module optical interconnections that allows for some degree of misalignment or play of components when initially joining the fibers together but which ensures precise alignment of the fibers in its assembled configuration.

BRIEF DESCRIPTION OF THE INVENTION

In accordance with the present invention the above and other objects are achieved by a connector configuration that is formed of a connector socket that may be mounted to a printed circuit card or optical module and a connector pin that is attached to a housing or a suitable bulkhead by which the printed circuit card or optical module is to be supported. Each of the connector socket and the connector pin has an internally threaded axial bore for receiving and retaining a single optical fiber cable coupler from the end of which an optical fiber strand extends. A suitable single fiber cable coupler may be of the type described in copending application Ser. No. 788,768 entitled "Fiber-Optic Connector for Single Fiber", filed Apr. 19, 1977 by W. C. Stankos, now U.S. Pat. No. 4,205,897, issued June 3, 1980, and assigned to the assignee of the present application. Each pin and socket includes a further precision bore through which the fibers pass to abut end-to-end in the precision bore of the socket. The socket further has a tapered end male section that is inserted into a corresponding tapered end female section of the pin, with the fiber held by the pin being automatically guided into the precision bore of the male section of the socket as the printed circuit card or module is inserted into the connector on the bulkhead.

To effect this automatic guidance of the fibers together, a bracket is mounted on the printed circuit card for holding the connector socket. The bracket is dimensionally positioned relative to the end of the card so that, when the card is mounted on the bulkhead through associated hardware, such as electrical pin connector support units, the optical fiber connector and socket will be properly dimensionally located for alignment and fiber coupling. The bracket includes an aperture through which the socket passes and which is of a larger internal diameter than the outer diameter of the socket. This size differential permits a small amount of play between the socket and the axis of the aperture in the bracket whereby the male end of the socket can be tilted relative to the axis of the bore in the bulkhead-mounted pin.

The socket is retained in the aperture of the bracket through a compression spring that is preferably seated in a recess in the bracket surrounding the aperture and abuts against a ring held in an annular groove in the socket. The spring urges the socket in the direction of the pin to which it is to be joined and cooperates with a section of the socket of wider diameter than the aperture and the ring to hold the socket on the bracket.

When the card or module is inserted into a support connector provided in the bulkhead, the male end of the socket is guided into the female end of the pin and the fiber strand extending into the female end bore portion of the pin is guided into the precision axial bore of the socket by virtue of the tapered surfaces of the end sections. Once the end faces of the fibers come into contact with one another, the compression spring is slightly compressed as the card or module assumes its finally retained position in its support connector. The compression of the spring provides a continuous biassing of the fibers together ensuring maximum fiber contact and signal coupling therethrough. If it becomes necessary to replace another one of the fibers this can be accomplished simply by removing the threaded cable coupler from the appropriate threaded bore and replacing the fiber coupler with a new unit. The card socket to bulkhead pin connection remains aligned and coupled.

DETAILED DESCRIPTION

Figure 1:
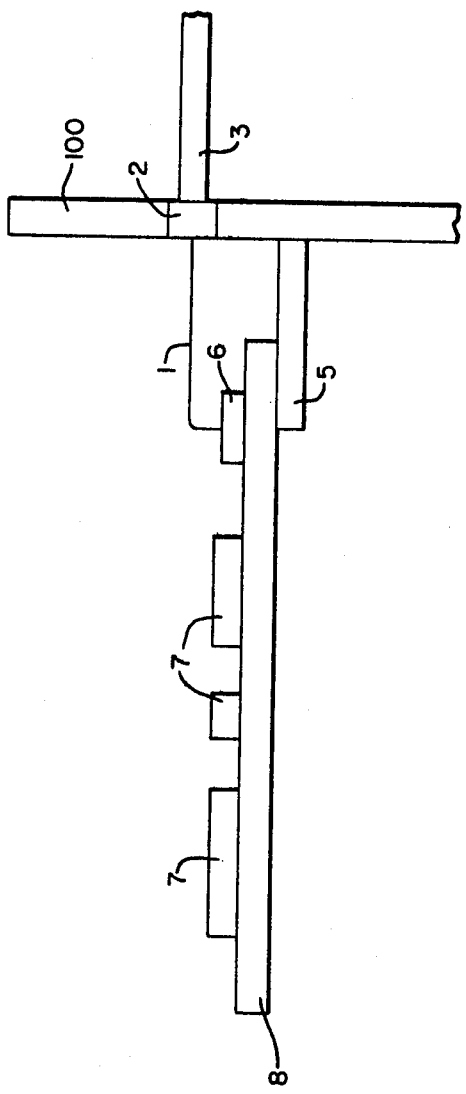
FIG. 1 is a general illustration of the mounting of a printed circuit board containing electro-optic components to a support structure with a coupling feed for an optical fiber.
Figure 2:
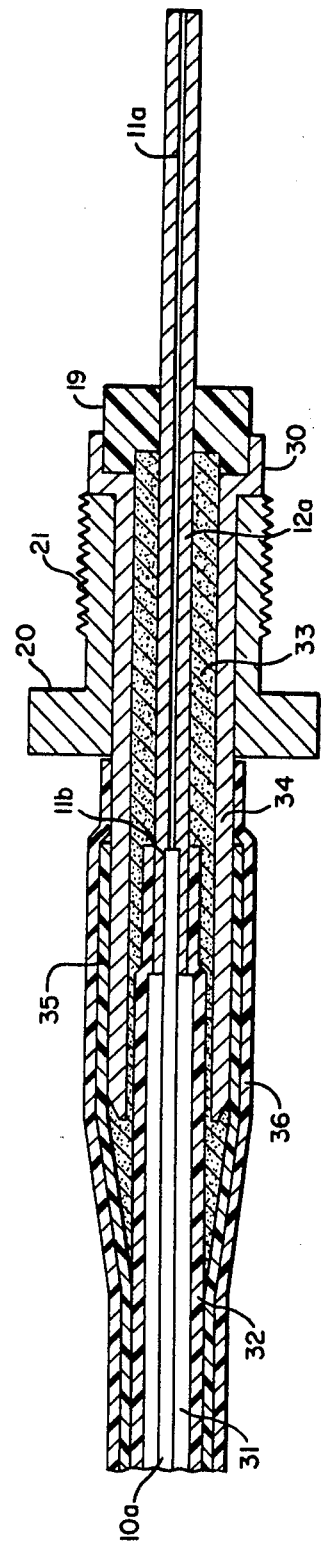
FIG. 2 is a longitudinal sectional view of an optical fiber terminal connector.

Referring to FIG. 2 there is shown a longitudinal sectional view of an optical fiber terminal connector of the type described in the above referenced copending Stankos U.S. Pat. No. 4,205,897, that may be used in cooperation with the socket and pin configuration of the present invention for intimately joining a pair of optical fibers together. While attention may be directed to the above identified application for a detailed description of the various aspects of such a terminal connector, a brief discussion of the same will be presented here in order to facilitate an understanding of the manner in which this type of connector advantageously cooperates with the socket and pin configuration of the invention.

The individual connector is provided at a terminal end of an optical fiber cable at the other end of which may be coupled an electro-optic component mounted on an electronic circuit board or card, or may be coupled externally of a cabinet drawer or hardware rack. The cable itself includes a filament or fiber of optically conductive material 11a surrounded by a protective jacket 10a. Surrounding the jacketed fiber is a layer of insulating tubing 31 such as teflon, over which there lies heat shrinkable tubing 32 surrounded by a fiber cable jacket 35. The connector itself includes a pin section 12a such as a stainless steel tube centrally bored with a precision hole through which the optical fiber 11a itself may pass, with the pin section 12a and fiber 11a flush with the exterior end of pin section 12a projecting beyond the end of the connector as shown. The interior end of the steel pin section has a further wider diameter bore 11b to accommodate a section of the jacketed portion of the fiber. Suitable adhesive is disposed between the material of pin section 12a defining the bore and the surface of the single fiber positioned in the bore for securing the fiber to the pin section 12a. Once the jacketed fiber has been thus secured within stainless steel pin section 12a, the insulating tubing portion of the cable is provided over the remaining exposed portion of the jacketed fiber for protection and is attached to the connector pin 12a by means of the heat shrinkable tubing 32.

The optical fiber with the pin attached is then assembled into a connector back shell 34 made of a rigid material, such as metal, and is properly positioned inside the connector body using a tool that will ensure proper axial and longitudinal positioning of the optical fiber pin 12a. An adhesive material 33, such as epoxy, is then disposed in the region between the connector pin 12a and the metallic back shell 34 of the connector portion so as to maintain the connector pin in proper position. The fiber cable jacket 35 which is made of a material having high tensile strength and a low modulus of elasticity, such as fiberglass, is then bonded to the connector back shell 34 and a heat shrink tubing 36 is provided over the connection serving not only to seal the connection but also provide a strain relief thereof. Disposed around pin 12a and confined within the open end of back shell 34 is a bushing 19 made of flexible material, such as Teflon which also serves as an adhesive stop. Surrounding the back shell 34 is a sleeve 20 having a threaded shank portion 21 which threadingly engages a threaded bore in the socket or pin into which the terminal connector is inserted, as will be described in detail below in connection with the description of FIGS. 3, 4 and 5.

Figure 3:
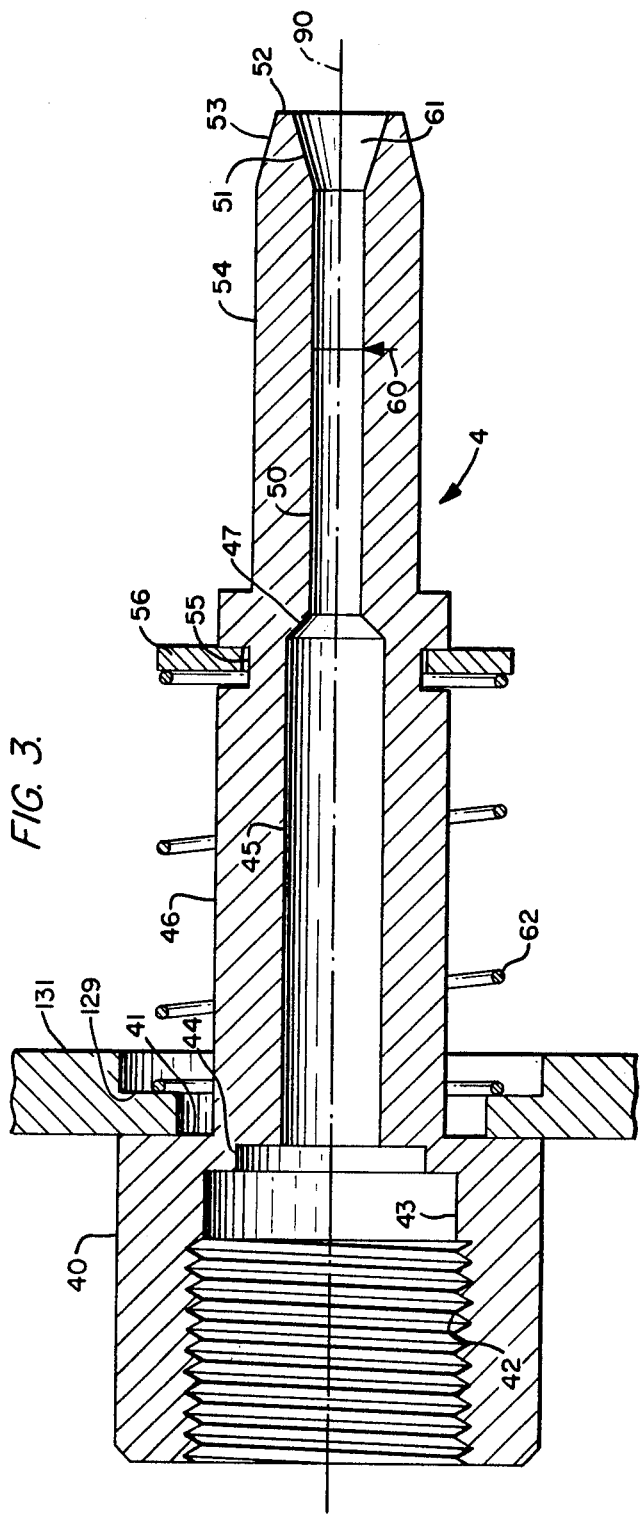
FIG. 3 is a detailed individual sectional illustration of an optical fiber connector socket.

FIG. 3 illustrates a longitudinal sectional view of the configuration of the socket portion of the connector arrangement of the present invention. As is the case with the optical fiber connector shown in FIG. 2 and the connector pin shown in FIG. 4, the socket portion is of a generally cylindrical configuration symmetric about a longitudinal optical fiber axis 90. The connector socket is made of a high strength machineable material such as stainless steel and comprises an end section 40 having a substantially planar or flat land portion 41 that is transverse to axis 90. Within end section 40 there is formed an internally threaded bore 42 appropriately sized for receiving and threadingly engaging the threaded shank portion 21 of the sleeve 20 of an optical fiber connector shown in FIG. 2. The unthreaded portion 43 of the bore is sized to receive the terminal end 30 of the connector back shell 34 of the connector as the sleeve 20 is tightened into the threaded bore 42. Extending from bore portion 43 is a further circular bore portion 44 of lesser diameter than bore portion 43 sized to accommodate bushing 19 that extends from the back shell 34 of the fiber connector illustrated in FIG. 2.

A longitudinal bore section extends from bore portion 44 within a cylindrical socket section 46 to a reduced longitudinal hole or bore 50 via a tapered bore 47. Reduced longitudinal bore 50 is a precision aperture for accommodating the optical fiber-containing pin section 12a that extends from the terminal end of the optical fiber connector. The length of the pin section 12a extending from the end of the connector is such that it terminates within the bore 50, as at the portion identified by arrow 60. Longitudinal bore 50 terminates and opens into a tapered aperture 61 extending to end face 52 of the socket. Tapered wall portion 51 assists in guiding the optical fiber from the connector mounted within the connector pin (FIG. 4) as the socket and pin are mated together. From this same end face a tapered end surface 53 extends to the outer diameter surface of the male end section 54 of the socket in which the reduced longitudinal bore is provided. The tapered end surface 53 assists in guiding male end section 54 of the socket into the female end section of the connector pin to be described below.

Cylindrical socket section 46 further includes an annular recess 55 for accommodating a suitable ring 56 such as a C-clip against which one end of a compression spring 62 extending toward flat land portion 41 abuts. The inner diameter of spring 62 is somewhat larger than the outer diameter of cylindrical socket section 46 so that there is play between the spring 62 and the socket 4. The spring 62 cooperates with ring 56 and the surface 129 of a bracket 124 on which the socket 4 is mounted to provide a bias force on the socket 4 and thereby optical fiber 11a held therein as will be described below in conjunction with the description of FIG. 5.

Figure 4:
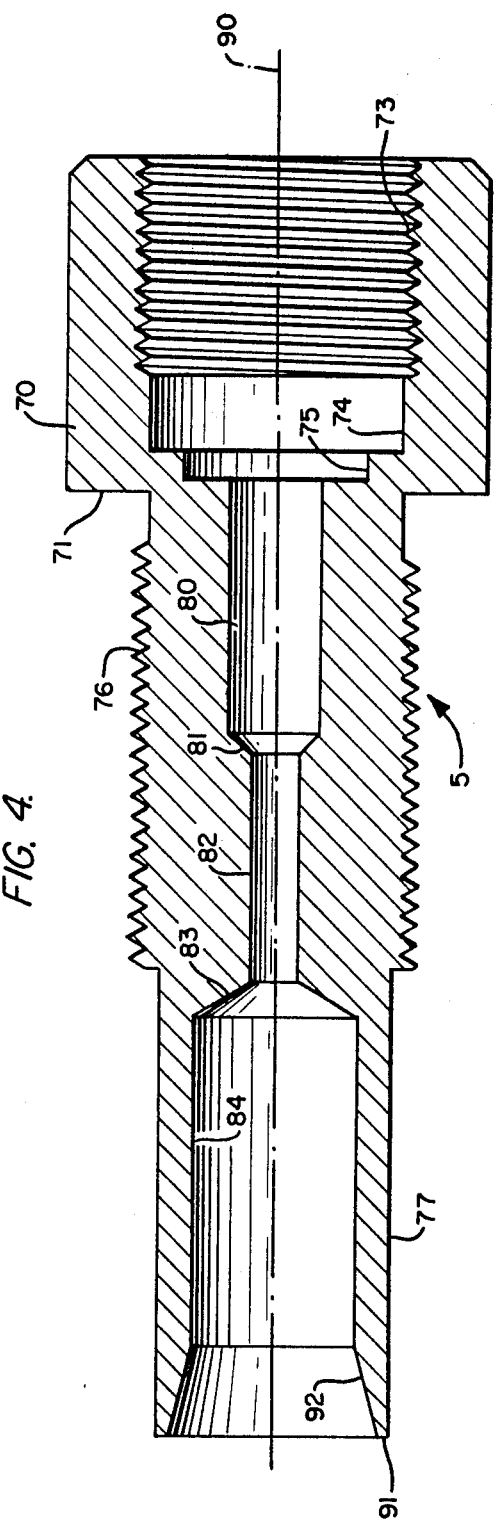
FIG. 4 is a detailed individual sectional illustration of an optical fiber connector pin.

The connector pin portion 5 of the optical fiber connector coupling assembly of the present invention is shown in longitudinal section in FIG. 4. The connector pin 5 which may be made of stainless steel includes an end section 70 having a substantially planar or flat land portion 71 that is transverse to axis 90. Within end section 70 there is formed an internally threaded bore 73 appropriately sized for receiving and threadingly engaging the threaded shank portion 21 of the sleeve 20 of an optical fiber connector as depicted in FIG. 2. Extending from the threaded portion 73 is an unthreaded portion 74 sized to receive the terminal end 30 of the connector back shell 34 of the connector as the sleeve 20 is tightened into the threaded bore 73. Extending from bore portion 74 is a further circular bore portion 75 of reduced diameter relative to bore portion 74 sized to accommodate bushing 19 that extends from the back shell 34 of the fiber connector.

From flat land portion 71 of the end section 70 of connector pin 5 there extends a threaded shank portion 76 from which there further extends a female end section 77. Within threaded shank portion 76 there is a longitudinal bore 80 extending from bore portion 75 toward the female end section 77. Bore 80 reduces at tapered portion 81 to a reduced precision longitudinal bore 82 sized to snuggly accommodate the optical fiber-containing pin section 12a that projects from the end of an optical fiber connector (FIG. 2) that has been inserted into the connector pin 5.

The female end section of the connector pin 5 has a tapered surface 92 opening from end face 91 to a longitudinal bore 84 of slightly larger diameter than the outer diameter of the male end section 54 of socket 4 (FIG. 4) and terminating at tapered portion 83 to which the precision reduced longitudinal bore 82 extends. Tapered surface 92 assists in guiding the male end section of socket 4 into bore 84 as the socket 4 and connector pin 5 are mated together.

Figure 5:
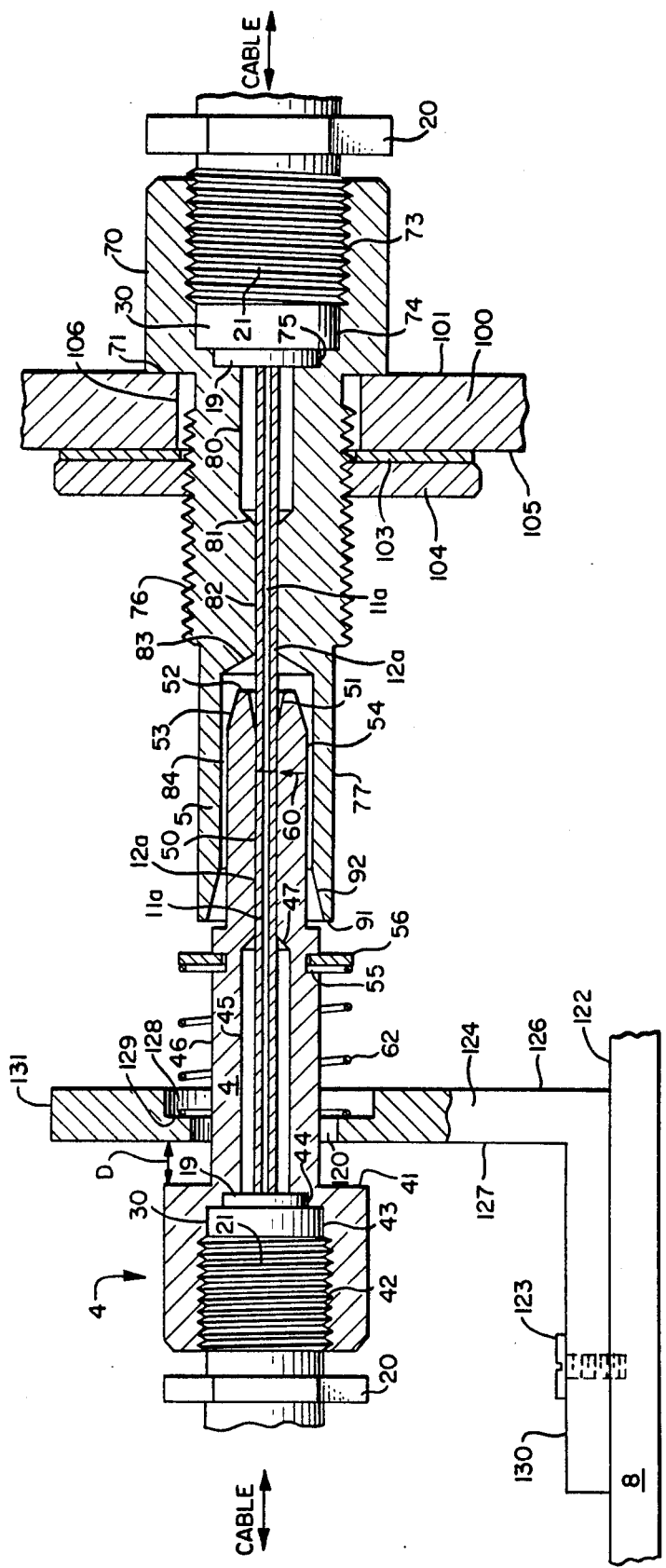
FIG. 5 is a detailed sectional illustration of the optical fiber connector socket-pin assembly of the present invention.

FIG. 5 illustrates the overall assembly of the socket 4 and connector 5 each containing an optical fiber connector 3, when a printed circuit card 8 is mounted to a connector affixed to a bulkhead 100 to hold the card in place and enable mating of the socket 4 into the connector 5 and thereby the abutting of the end faces of optical fibers 11a within pin sections 12a. As is shown in FIG. 5 face 71 of the end section 70 of connector pin 5 is urged against face 101 of bulkhead 100 by threading a locking nut 104 onto threaded shank section 76 and frictionally tightening a washer 103 against face 105 of bulkhead 100, after the shank portion has been inserted through a suitable hole 106 for accommodating the connector pin.

In a slightly similar fashion, the longitudinal unthreaded cylindrical section 46 of socket 4 is inserted into a hole 120 provided in a bracket 124. Hole 120 is of somewhat larger diameter than the outer diameter of section 46 of socket 4 so that a slight amount of play between the socket 4 and hole 120 is afforded. As a result, even with a minor degree of misalignment between the male and female end portion of the socket 4 and connector pin 5, respectively, as the printed circuit card 8 is brought into engagement with its associated connector on bulkhead 100, the socket 4 can be pivoted or displaced somewhat by the guiding action of the cooperation between tapered exterior surface 53 of socket 4 and the tapered interior surface 92 of connector pin 5 and thereby be easily inserted into pin connector pin 5.

Bracket 124 may be made of aluminum and is L-shaped with base section 130 mounted flush with the surface 122 of printed circuit card 8 and being held in frictional engagement with the card as by a suitable screw 123 or a plurality of such screws. The upper leg portion 131 of bracket 124 has a circular recess 128 extending from face 126 a prescribed depth into the leg 131 of the bracket, with circular hole 120 and circular recess 128 being coaxial with the axis of socket 4. The diameter of recess 128 approximates but is slightly larger than the diameter of spring 62 so as to provide a guiding seat for one end of the spring against the bottom 129 of the recess. The bottom 129 of recess 128 faces ring 56 and engages one end of spring 62, the other end of which abuts against ring 56. Spring 62 cooperates with the bottom 129 of recess 128 in bracket 124 and ring 62 held by socket 4 to urge or bias socket 4 towards pin connector 5. In the mating arrangement depicted in FIG. 5, face 41 of end section 40 of socket 4 is displaced or slightly removed from face 127 of bracket 124 by virtue of the preassigned dimensions defining the distance between the face 127 of bracket 124 and the face 105 of bulkhead 100 when the printed circuit card 8 is held by its associated bulkhead connector. The male end section 54 of socket 4 is inserted into open bore section 84 of female end section 77 of the connector pin 5 and the optical fibers 11a within pin sections 12a of the respective terminal connectors abut against one another at their end faces within bore 50 of socket 4 at arrow 60. Spring 62 provides a continuous bias on the end faces of the optical fibers by urging ring 56 away from the bottom 129 of recess 128 in bracket 124, and consequently, urging socket 4 towards connector pin 5.

Thus, during insertion of the printed circuit card 8 into its mounting connector on bulkhead 100, once the male end section 54 of socket 4 has been guided into longitudinal bore 84 of connector pin 5 it travels within bore 84 towards tapered section 83 as the card 8 is guided into its associated connector in bulkhead 100. As end 52 of socket 4 approaches tapered section 83 pin section 12a, containing optical fiber 11a within precision bore 82 of connector 5 is guided into precision bore 50 of socket 4 by tapered surface 51. Upon the pin sections 12a and optical fibers 11a abutting one another at position 60 within precision bore 50, face 41 of socket 4 separates from face 127 of bracket 124 and spring 62 is compressed thereby urging ring 56 and consequently socket 4 and the optical fiber 11a held thereby toward the optical fiber 11a held by connector pin 5.

In its finally installed position printed circuit card 8 is so positioned relative to bulkhead 100 that there is a small separation D between face 41 of socket 4 and face 127 of bracket 124 thus assuring compression of spring 62 and the intended bias force urging the end faces of the optical fibers against one another.

Because of the automatic guidance of the connector pin and socket together and the abutment of the optical fibers in the precision bore of the socket, it has been found that the fiber connector of the present invention not only serves as a blind connector for optical fibers, thus eliminating cumbersome handling and attachment problems of the prior art, but also exhibits excellent operational characteristics. In tests conducted on the optical thruput performance of the coupler during which the socket and connector pin were alternately mated and separated over different angles of relative rotation about axis 90, losses through the fibers were found to average only on the order of one and a quarter dB. Also the connector pin surfaces showed no signs of dirt or marks of condensation in a temperature environment from $-50°$ to $+70°$ C. It will be appreciated, accordingly, that the socket-connector pin configuration of the present invention offers a significant advance over previously proposed arrangements.

In the above described embodiment spring 62 was described as being seated at the bottom 129 of a recess 128 provided in bracket 124. However, while the recess provides a guiding seat for spring 62 and facilitates assembly, it may be omitted with spring 62 abutting against face 126 of bracket 124.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. An optical fiber connector assembly, adapted for use with an optical module unit that is retained by a connector arrangement mounted on a module unit support structure, for joining a first optical fiber associated with said optical module unit in abutting end-to-end relationship with a second optical fiber associated with said module unit support structure comprising:

a first optical fiber connector subassembly adapted to be mounted on one of said optical module unit and said module unit support structure so as to possess an amount of play relative to said one of said optical module unit and said module unit support structure and thereby to an axis along which said first and second optical fibers are to be joined together, said first subassembly retaining therein said first optical fiber; and a second optical fiber connector subassembly adapted to be mounted on the other of said optical module unit and said module unit support structure, said second subassembly retaining therein said second optical fiber; and wherein said first and second optical fiber connector subassemblies are positioned on said one and said other of said unit and structure so that as said optical module unit is joined to said module unit support structure, said first subassembly is permitted to undergo displacement relative to its mounting on said one of said optical module unit and said module unit support structure and thereby to said axis, whereby said first and second subassemblies are caused to be connected together and urge said first and second optical fibers into abutting end-to-end relationship.

2. An optical fiber connector assembly according to claim 1, wherein said one of said optical module unit and said module unit support structure includes means for supporting said first subassembly for connection with said second subassembly while permitting said first subassembly to be displaced in a direction away from said second subassembly mounted on said other of said optical module unit and said module unit support structure.

3. An optical fiber connector assembly according to claim 2, further including a spring seated against one end of said supporting means and mechanically coupled with said first subassembly for urging said first subassembly toward said second subassembly and thereby urging said first optical fiber retained therein into abutting end-to-end engagement with said second optical fiber retained by said second subassembly.

4. An optical fiber connector assembly according to claim 2, wherein said optical module unit comprises an electronic/optic circuit-containing board having mounted thereon a bracket by way of which said first optical fiber connector subassembly is supported, said bracket having an aperture through which said first subassembly is permitted to undergo said displacement.

5. An optical fiber connector assembly according to claim 4, further including a spring seated against one face of said bracket and mechanically coupled with said first subassembly for urging said first subassembly toward said second subassembly and thereby urging said first optical fiber retained therein into abutting end-to-end engagement with said second optical fiber retained by said second subassembly.

6. An optical fiber connector assembly according to claim 5, wherein said first subassembly includes a ring mounted thereon, said spring being retained around said first subassembly between said ring and said one face of said bracket.

7. An optical fiber connector assembly according to claim 6, wherein said one face of said bracket includes a recessed portion against the bottom of which one end of said spring is seated.

8. An optical fiber connector assembly according to claim 7, wherein the diameter of said first subassembly on the side of said bracket opposite that upon which said ring is mounted is larger than the diameter of said aperture in said bracket.

9. An optical fiber connector assembly according to claim 4, wherein the diameter of the aperture in said bracket is larger than the outer diameter of said first subassembly passing therethrough so as to permit said amount of play between said bracket and said first subassembly relative to the axis of said first and second optical fibers.

10. An optical fiber connector assembly according to claim 9, further including a spring seated against one face of said bracket and mechanically coupled with said first subassembly for urging said first subassembly toward said second subassembly and thereby urging said first optical fiber retained therein into abutting end-to-end engagement with said second optical fiber retained by said second subassembly.

11. An optical fiber connector assembly according to claim 1, wherein each of said first and second subassemblies includes an interior bore through which a respective one of said optical fibers and a surrounding protection fiber pin snugly extend, with said optical fibers and said pins abutting end-to-end in the interior bore of said first subassembly upon the joining of said first and second subassemblies together.

12. An optical fiber connector assembly according to claim 11, wherein said first subassembly includes a first end section having a tapered outer surface portion extending from an end face thereof, and said second subassembly includes a second end section having a tapered inner surface portion extending from an end face thereof into a hollow bore portion, into which said second optical fiber and surrounding protective pin extend, for receiving the first end section of said first subassembly.

13. An optical fiber connector assembly according to claim 12, wherein said first subassembly further includes a tapered inner surface portion leading from said end face of said first end section to its interior bore, so that upon the joining of said first end section of said first subassembly into the hollow bore portion of the second end section of said second subassembly, said second optical fiber and surrounding protective pin may be guided into the interior bore of said first subassembly so as to abut end-to-end with said first optical fiber therein.

14. An optical fiber connector assembly according to claim 11, wherein said first subassembly includes a socket into which an optical fiber terminal connector for said first optical fiber may be inserted and retained thereby, with said first optical fiber extending from the optical fiber terminal connector into the interior bore of said socket.

15. An optical fiber connector assembly according to claim 14, wherein said second subassembly includes a connector pin into which an optical fiber terminal connector for said second optical fiber may be inserted and retained thereby, with said second optical fiber extending from the optical fiber terminal connector into the interior bore of said connector pin.

16. For use in an optical fiber connector assembly, adapted for use with an optical module unit that is retained by a connector arrangement mounted to a module unit support structure, for joining a first optical fiber associated with said optical module unit in abutting end-to-end relationship with a second optical fiber associated with said module unit support structure, an optical fiber connector subassembly comprising:
　first means for retaining therein one of said first and second optical fibers,
　second means, adapted to be coupled to one of said optical module unit and said module unit support structure, for supporting said first means while providing an amount of play therebetween so that said first means is displaceable relative to said second means and thereby to an axis along which said first and second optical fibers are to be joined together,
　whereby, during the joining of said optical module unit to said module unit support structure, said first means is permitted to undergo a displacement relative to said second means and thereby to said axis, thereby causing the optical fiber retained thereby to be urged into abutting end-to-end relationship with the other of said first and second optical fibers retained by the other of said optical module unit and said module unit support structure.

17. An optical fiber connector subassembly according to claim 16, wherein said second means includes means for supporting said first means while permitting said first means to be displaced in a direction away from the other of said optical module unit and said mobile unit support structure.

18. An optical fiber connector subassembly according to claim 16, wherein said first means comprises a socket into which an optical fiber terminal connector for said one of said optical fibers may be inserted and retained thereby, with said one optical fiber extending from the optical fiber terminal connector into an interior bore provided in said socket.

19. An optical fiber connector subassembly according to claim 18, wherein said second means comprises a bracket coupled with said module unit for receiving said socket therein, said bracket having an aperture through which said socket extends, with the displacement of said socket being capable of occurring at the portion of said bracket in which said aperture is provided.

20. An optical fiber connector subassembly according to claim 19, wherein said second means further comprises a spring seated against an interior face of said bracket and being mechanically coupled with said socket for urging said socket toward said support structure.

21. An optical fiber connector subassembly according to claim 20, wherein said socket includes a flange, of a diameter wider than said aperture, which is urged toward an exterior face of said bracket in which said aperture is provided by the action of said spring.

* * * * *